(12) United States Patent
Towle et al.

(10) Patent No.: US 7,177,504 B2
(45) Date of Patent: Feb. 13, 2007

(54) MANUFACTURABLE CONNECTORIZATION PROCESS FOR OPTICAL CHIP-TO-CHIP INTERCONNECTS

(75) Inventors: Steven Towle, deceased, late of Phoenix, AZ (US); by Anna M. George, legal representative, Sunnyvale, CA (US); Daoqiang Lu, Chandler, AZ (US); Henning Braunisch, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/955,897

(22) Filed: Sep. 30, 2004

(65) Prior Publication Data

US 2006/0067624 A1    Mar. 30, 2006

(51) Int. Cl.
*G02B 6/30*      (2006.01)
*G02B 6/26*      (2006.01)
*G02B 6/36*      (2006.01)

(52) U.S. Cl. .............................. 385/49; 385/52; 385/88
(58) Field of Classification Search .................. 385/49, 385/52
See application file for complete search history.

(56) References Cited

U.S. PATENT DOCUMENTS

| | | | |
|---|---|---|---|
| 5,719,978 A * | 2/1998 | Kakii et al. ..................... 385/89 |
| 6,227,722 B1 * | 5/2001 | Kropp .......................... 385/88 |
| 6,238,100 B1 * | 5/2001 | Sasaki et al. .................. 385/59 |
| 6,257,769 B1 | 7/2001 | Watanabe et al. |
| 6,317,964 B1 * | 11/2001 | Robertsson et al. .......... 29/601 |
| 6,506,629 B1 * | 1/2003 | Kinsman et al. ............ 438/122 |
| 6,867,668 B1 * | 3/2005 | Dagostino et al. .......... 333/246 |
| 6,964,527 B2 * | 11/2005 | Sasaki et al. .................. 385/88 |

(Continued)

FOREIGN PATENT DOCUMENTS

EP     0859254 A2     8/1998

(Continued)

OTHER PUBLICATIONS

PCT/US2005/035473, PCT International Search Report and Written Opinion, (Feb. 24, 2006).

(Continued)

*Primary Examiner*—Michelle Connelly-Cushwa
*Assistant Examiner*—Chris Chu
(74) *Attorney, Agent, or Firm*—Blakely, Sokoloff, Taylor & Zafman LLP (57) ABSTRACT

An apparatus comprising a substrate having a trench therein, the trench extending to an edge of the substrate, a waveguide array positioned in the trench, the waveguide array extending to the edge of the substrate, and a ferrule attached at or near the edge of the substrate and spanning a width of the waveguide array, the ferrule being directly in contact with a surface of the waveguide array. A process comprising positioning a waveguide in a trench on a substrate, the waveguide extending to an edge of the substrate, and attaching a ferrule at or near the edge of the substrate, the ferrule including a recess having a bottom, wherein the bottom is in direct contact with a surface of the waveguide.

32 Claims, 8 Drawing Sheets

U.S. PATENT DOCUMENTS

2001/0010742 A1    8/2001  Nakagawa et al.
2002/0114589 A1    8/2002  Igl et al.
2002/0154869 A1*  10/2002  Chan et al. .................. 385/88
2003/0174969 A1*   9/2003  Vodrahalli et al. ............ 385/53
2003/0223707 A1*  12/2003  Nakanishi et al. ............ 385/92

FOREIGN PATENT DOCUMENTS

EP           1063549 A1    12/2000

OTHER PUBLICATIONS

Pimpinella, R.J. et al., "Optical Connectors and Variable Losses in Coupling Multimode Fibers," *IEEE*, 1993, pp. 329-335, no month.

Maeno, Koichi et al., "Development of Mini-MT Ferrule Using Short-Cycle Injection Molding," *Furukawa Review*, No. 19, 2000, pp. 143-148, no month.

Mohammed, E.M. et al., "Optical I/O Technology for Digital VLSI," *Proceedings of the SPIE*, vol. 5358, Jun. 2004, pp. 60-70.

* cited by examiner

MANUFACTURABLE CONNECTORIZATION PROCESS FOR OPTICAL CHIP-TO-CHIP INTERCONNECTS

TECHNICAL FIELD

Embodiments of the present invention relate generally to optical packages and in particular, but not exclusively, to optical packages that are connectorized to be readily connectable to other optical devices.

BACKGROUND

Electronic devices are often made up of many modules that are put together in such a way that they accomplish the task for which the overall electronic device is designed. Proper function of the device often requires extensive communication between and among the modules that make up the device. In many devices, the communication between modules is done using electrical signals. Electrical communication, however, hits bandwidth limits as the communication speed increases. Optical communication has emerged as an attractive alternative to electrical communication because it does not suffer the same bandwidth problems that electrical communication suffers.

Despite its advantages, however, optical communication between components in a device comes with its own set of challenges. Part of the advantage of a modular device design is that the individual modules are easy to install and can be easily removed from the device for either replacement or upgrade. Where modules that communicate optically are involved, one challenge brought on by the modular design is how to "connectorize" the individual modules, giving each module one or more separable interfaces so that they can easily be inserted and connected to the device and removed from the device when necessary.

One current approach is to pre-fabricate an already connectorized waveguide and mount it on the top surface of the package substrate. The pre-fabricated connectorized waveguide has a rigid connector attached to the end of a flexible waveguide. Attaching an already connectorized waveguide to a module requires accurate positioning on the module (usually on a substrate that is part of the module) of a component which includes both a rigid connector and flexible waveguide. This presents significant manufacturing difficulties, principally because machines used to manufacture the modules can usually only handle rigid components or flexible components, but not components that include both rigid and flexible parts. While in some cases existing machines can be made to handle components that include both rigid and flexible parts, this adds significantly to the cost of manufacturing the module and significantly affects the accuracy (i.e., the dimensional tolerances) with which the connector can be attached to the module.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus and method for package-level optical interconnects are described herein. In the following description, numerous specific details are described to provide a thorough understanding of embodiments of the invention. One skilled in the relevant art will recognize, however, that other embodiments of the invention can be practiced without one or more of the specific details, or with other methods, components, materials, etc. In other instances, well-known structures, materials, or operations are not shown or described in detail but are nonetheless encompassed within the scope of this description.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
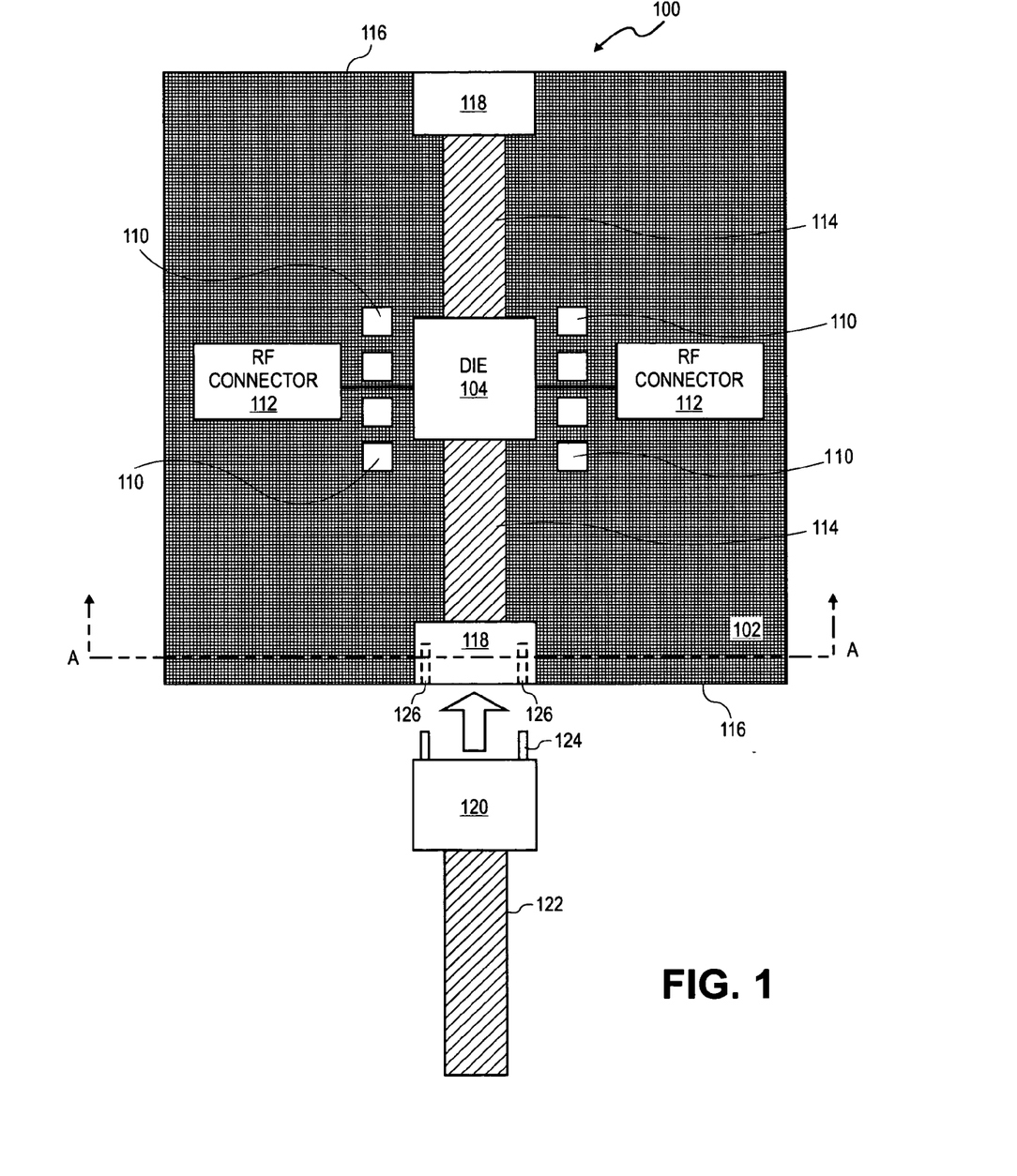
FIG. 1 is a top plan view of an embodiment of an optical package including an embodiment of the present invention.

FIG. 1 illustrates an embodiment of an optical package 100 including an embodiment of a connector of the present invention. The optical package 100 includes a substrate 102 on which are mounted an optical die 104 and various supporting components, such as capacitors 110 and radio frequency (RF) connectors 112. The capacitors 110 are connected to the die 104 and, similarly, the RF connectors 112 are connected to the optical die 104. In other embodiments, the optical package 100 may include more, less, or different components.

The optical die 104 is generally flip-chip mounted to the substrate 102 and transmits and receives optical signals through optical waveguide arrays 114 that extend from beneath the optical die 104 to the edges 116 of the substrate. To enable the optical package 100 to form part of a larger system and to be readily inserted into and removed from such a system, there should be a separable interface that allows the waveguide arrays 114 to be readily connected or disconnected to the corresponding waveguide arrays of other devices. This separable connection to other components is accomplished through one or more connectors 118 positioned and mounted at or near the edges 116 of the substrate 102. In the embodiment shown, the connector 118 is a female connector having a pair of alignment holes 126 therein. To connect the optical package 100 to another optical component, a corresponding external male connector 120 is mated with the female connector 118 such that the alignment pins 124 on the male connector 120 mate with the alignment holes 126 in the female connector 118. In other embodiments, the connector 118 can be a male connector while the connector 120 can be a female connector. Once the connectors 118 and 120 are mated, optical signals can be carried from the optical die 104 to the connector 118 by the waveguide array 114, where they are transferred into the external waveguide array 122 for transmission to other parts of the system within which the optical package 100 is used. Alternatively, external signals can be received at the connector 120 from the external waveguide array 122, where they are transferred through the connector 118 to waveguide array 114 and on to the optical die 104.

Figure 2A:
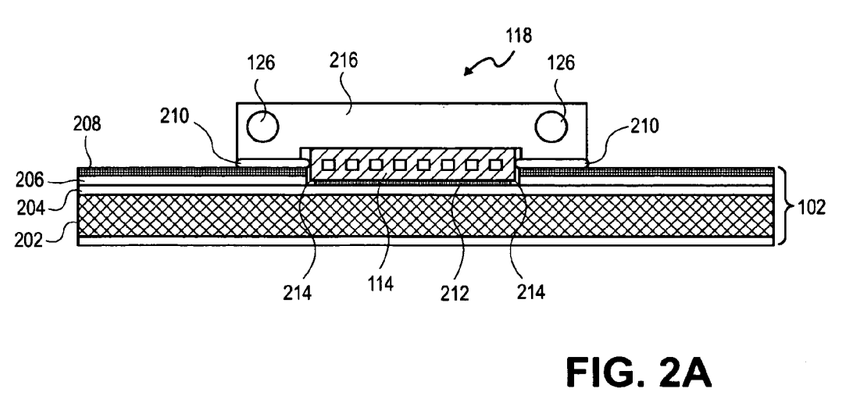
FIG. 2A is a side elevation of an embodiment of an assembled connector of the present invention, taken substantially along section line A—A in FIG. 1.

FIG. 2A is a cross-section taken substantially along the section line A—A in FIG. 1 illustrating the details of an embodiment of the connector 118. The connector 118 is positioned at or near the edge 116 of the substrate 102. In the embodiment shown, the substrate 102 includes multiple layers of material, for example a core 202, an inter-layer dielectric 204 placed on the core, a conductive layer 206 placed on the inter-layer dielectric 204, and a layer of solder resist 208 placed on the conductive layer 206. In one embodiment of the substrate, the core 202 can comprise a single material such as a semiconductor (e.g., silicon), an organic material (e.g., bismaleimide triazine), a ceramic material (e.g., a high-temperature or low-temperature co-fired ceramic) or a metal, or can comprise a plurality of different layers of differing materials. In one embodiment, for instance, the core 202 can comprise a core layer with alternating layers of dielectrics and conductors layered on either side of the core. The conductive layer 206 is deposited onto the base substrate; in one embodiment, the conductive layer is made from copper (Cu), but in alternative embodiments it can comprise other conductive materials such as gold (Au), silver (Ag) or aluminum (Al) as well as other metals or combinations or alloys of metals. Conductive non-metals can also be used for the conductive layer 206. The solder resist layer 208 is deposited on the conductive layer 206 to resist the effects of solder from flip-chip bonding or other connections to the substrate. In other words, the solder resist layer prevents undesired contacts between the solder and the conductive layer 206. In other embodiments the substrate 102 can include a greater or lesser number of layers, and can include different materials layered in a different sequence than the ones described.

The substrate 102 includes a trench 214 formed in one or more layers of the substrate, in this case the solder resist layer 208 and the conductive layer 206. In the embodiment shown, the trench 214 is patterned and etched in the solder resist layer 208 and the conductive layer 206. Etching, however, is only one method of forming the trench. In other embodiments the solder mask may be printed selectively, avoiding the trench area, or material can be removed by micromachining or laser ablation. The width of the trench 214 is selected to allow the waveguide array 114 to be positioned within the trench, and the depth of the trench is calculated to accommodate at least part of the height of the waveguide array 114. In one embodiment, the waveguide array 114 is positioned in the trench and secured in position using a layer of adhesive 212, although in other embodiments the waveguide array can be secured to the bottom of the trench by other means, or can be secured to other parts of the trench. To complete the connector 118, a ferrule 216 is positioned directly on the waveguide array 114 and secured to the substrate 102 via adhesive 210. The ferrule 216 with alignment holes 126 serves to align the waveguide array 114 with the external waveguide array 122 (see FIG. 1) to which it will be coupled. Further details of the waveguide array 114 and the ferrule 216 are described below in connection with FIGS. 3 and 4.

Figure 2B:
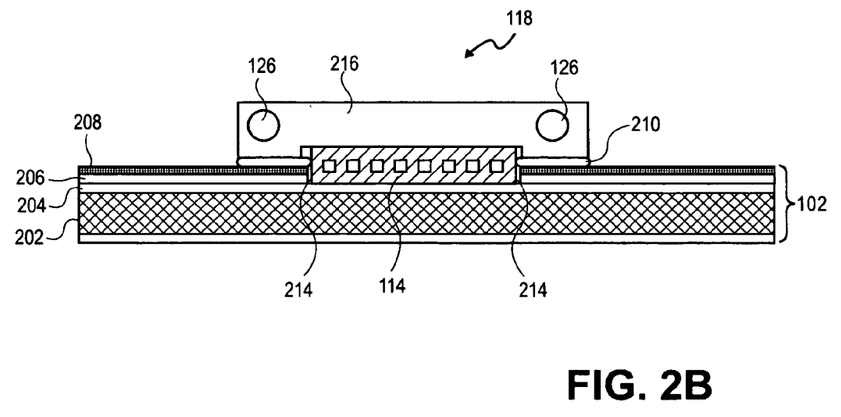
FIG. 2B is a side elevation of an alternative embodiment of an assembled connector of the present invention, taken substantially along section line A—A in FIG. 1.

FIG. 2B illustrates an alternative embodiment of the connector 118 in which the waveguide array 114 is integrated with the substrate 102, i.e., rather than being fabricated separately and then attached to the substrate 102 via a layer of adhesive 212, the waveguide array 114 is fabricated into the substrate as part of the process of building up the layers 204, 206, 208 on the core 202. Such waveguide integration may improve manufacturability of the connector 118.

Figure 3:
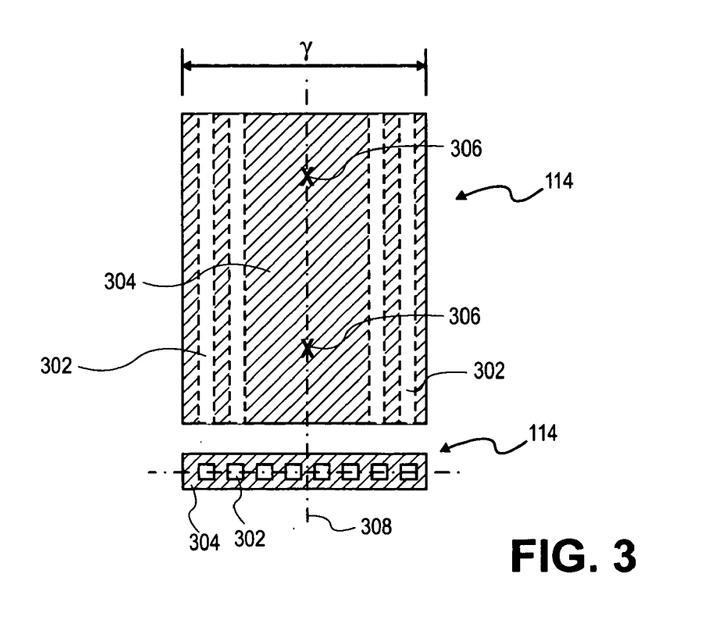
FIG. 3 is a side and plan view of an embodiment of a waveguide array usable with the present invention.

FIG. 3 illustrates two views of the construction of an embodiment of a waveguide array 114. The waveguide array 114 has a width y and includes one or more individual waveguides 302 embedded within a layer of cladding 304. At the ends of the waveguide array 114, each waveguide 302 forms of aperture through which optical signals can enter and exit the waveguide. In the embodiment shown, the individual waveguides 302 are regularly spaced along a straight line substantially in the middle of the waveguide and are also substantially symmetrical about the centerline 308 of the waveguide. In other embodiments of the waveguide array 114, however, the optical waveguides could be arranged differently. For example, the optical waveguides could be positioned such that they are not along a straight line, could be irregularly spaced, or both. In other embodiments the waveguides may include one or more bends for routing of optical signals. The waveguide array 114 also includes one or more fiducial marks 306 placed on one or both sides of the array. In the embodiment shown, the fiducial marks are on the cladding 304 and are positioned along the centerline 308 of the waveguide, although in other embodiments the fiducial marks could be placed elsewhere on the waveguide. The fiducial marks can be placed on the waveguide with techniques such as screen printing, etching, molding or other techniques or combinations of techniques known in the art.

Figure 4:
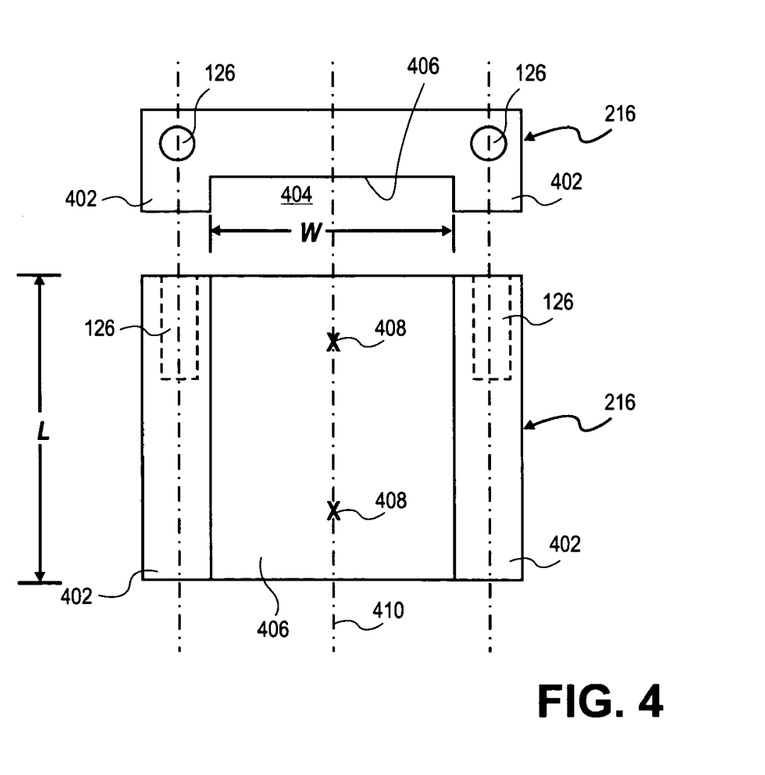
FIG. 4 is a side and plan view of an embodiment of a ferrule usable with the present invention.

FIG. 4 illustrates two views showing the construction of an embodiment of the ferrule 216. The ferrule 216 has an overall length L and has a substantially rectangular cross-section with a recess 404 on one side. The recess 404 has a width W and runs along the entire length L of the ferrule 216. The width W is selected to be at least as large as the width γ of the waveguide array 114. The recess 404 is bordered on two sides by a pair of supports 402 and has a bottom 406 on which one or more fiducial marks 408 are placed. In the embodiment shown, the fiducial marks 408 are positioned on the bottom 406 of the recess along a centerline 410 of the ferrule 216, although in other embodiments the fiducial marks could be placed elsewhere on the ferrule. The fiducial marks 408 can be placed on the connector with techniques such as laser machining, etching, molding, or other techniques or combinations of techniques known in the art. In the embodiment shown, the ferrule is female and includes a pair of alignment holes 126 to receive alignment pins 124 from a mating male connector (see FIG. 1). In other embodiments, however, the ferrule 216 can be male and the connector 120 female. In one embodiment, the ferrule 216 is made using a polymer that is precision-molded, e.g., injection-molded. Transfer molding techniques, combined with newer thermosetting polymers with low molding shrinkage, can result in ferrules with dimensional tolerances on the order of fractions of a micron. In different embodiments, however, different materials and manufacturing techniques can be used.

Figure 5:
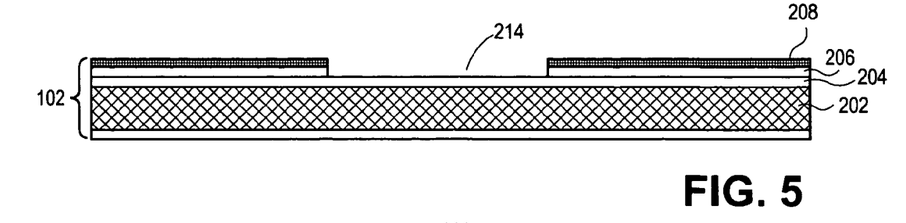
FIGS. 5–8 are side elevations illustrating an embodiment of a process for assembling an embodiment of the connector of the present invention.

FIGS. 5–8 illustrate an embodiment of a process for constructing the embodiment of the connector 118. FIG. 5 illustrates the starting point, which is to have a substrate 102 with a trench 214 therein, as described above in connection with FIG. 1. In the embodiment shown, the trench 214 is patterned and etched in the solder resist layer 208 and the conductive layer 206. Etching, however, is only one method of forming the trench. In other embodiments the solder mask may be printed selectively, avoiding the trench area, or material can be removed by micromachining or laser ablation.

Figure 6:
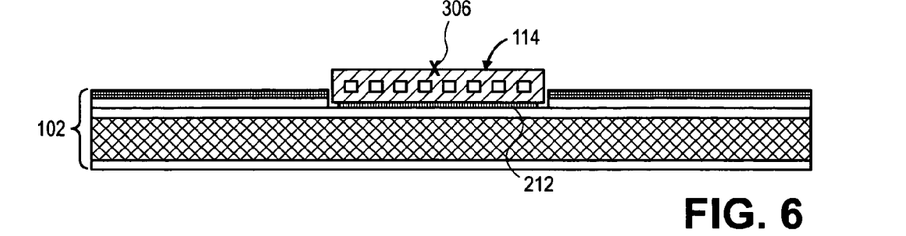

FIG. 6 illustrates the placement of the waveguide array 114 in the trench 214. A layer of adhesive 212 secures the waveguide array 114 in the trench and maintains its position, both during assembly and thereafter. In one embodiment, the adhesive 212 is first placed in the trench and the waveguide array 114 is positioned placed in the trench and on the adhesive, for example using known pick-and-place techniques that are compatible with a flexible element such as the waveguide array 114. In another embodiment, the waveguide array 114 can be provided with an ultraviolet (UV) or thermally curable tacky film on a release layer and can be picked and placed in the same way that labels are currently picked and placed. The waveguide array 114 also includes one or more fiducial marks 306 to assist in properly aligning the waveguide and the ferrule 216. The fiducial marks 306 can also be used to assist in aligning the waveguide and the substrate 102 that may include one or more fiducial marks in order to facilitate optical coupling of the waveguide and the die 104 shown in FIG. 1.

Figure 7:
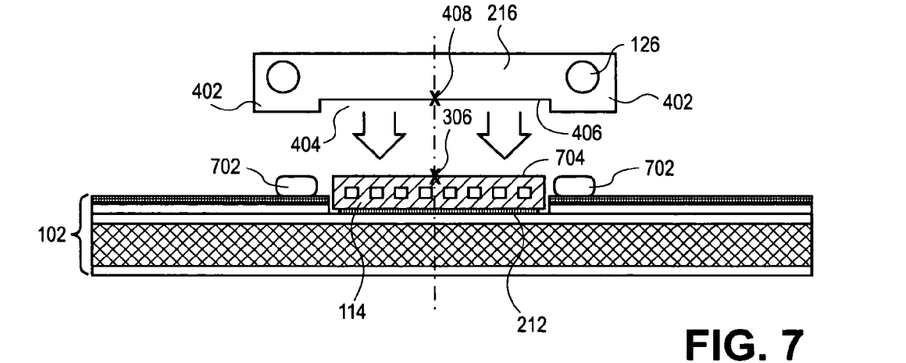

FIG. 7 illustrates the placement of the ferrule 216 onto the substrate 102. The ferrule 216 includes a pair of supports 402 between which there is a recess 404. The recess 404 in turn has a bottom 406 with fiducial marks 408 positioned thereon. After the waveguide array 114 is secured in the trench 214, beads of adhesive 702, such as a UV or thermally curable adhesive, are dispensed on either side of the trench. The ferrule 216 is positioned above the waveguide array 114 and aligned so that the fiducial marks 408 on the ferrule are used together with the fiducial marks 306 on the waveguide to substantially align the ferrule with the waveguide. In one embodiment, the fiducial marks are aligned using a split optics system, such as those found on the M9 series bonders from Besi Die Handling of Londonderry, N.H. In the embodiment shown, the fiducial marks 306 are along the centerline of the waveguide array 114 and the fiducial marks 408 are along the centerline of the ferrule 216, so alignment of the ferrule and the waveguide is accomplished by exactly aligning the fiducial marks. In other embodiments, however, the fiducial marks 408 on the ferrule 216 can be offset from the fiducial marks 306 on the waveguide array 114. Where the fiducial marks 306 and 408 are positioned on the ferrule and the waveguide is irrelevant, so long as the proper offsets between the fiducial marks are known. In still another embodiment, there can be a fiducial mark on the substrate. In this case, the fiducial marks on both the ferrule 216 and the waveguide array 114 are aligned relative to the fiducial mark on the substrate, resulting in proper alignment between the ferrule and the waveguide array.

Figure 8:
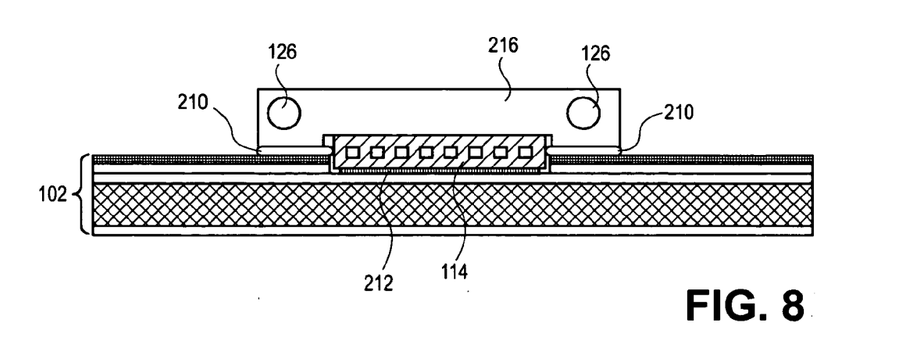

Once the ferrule 216 and the waveguide array 114 are substantially aligned, the ferrule 216 is lowered onto the adhesive beads 702 and a force is applied to the connector to force the bottom 406 of the recess 404 into direct contact with the surface 704 of the waveguide array 114. No adhesives or other materials are inserted between the bottom 406 and the surface 704, so that the waveguide functions as a precise mechanical stop for the placement of the ferrule 216 with alignment holes 126. In the case of UV curable adhesives, while the force is holding the connector, UV light can be shone onto the adhesive to partially cure the adhesive essentially instantly. The partially cured adhesive will hold the connector in place. A post thermal curing step is generally required to fully cure the adhesive material 702. The post cure step is a batch process, and many units can be processed at one time in a batch oven. If after bonding is completed the end of the waveguide array 114 and the ferrule 216 are not flush with the edge of the substrate 102, the edge of entire assembly can be polished to make them flush so that a better connection with the mating connector can be achieved. FIG. 8 illustrates the connector in its finished form, as described above in connection with FIG. 2.

Figure 9:
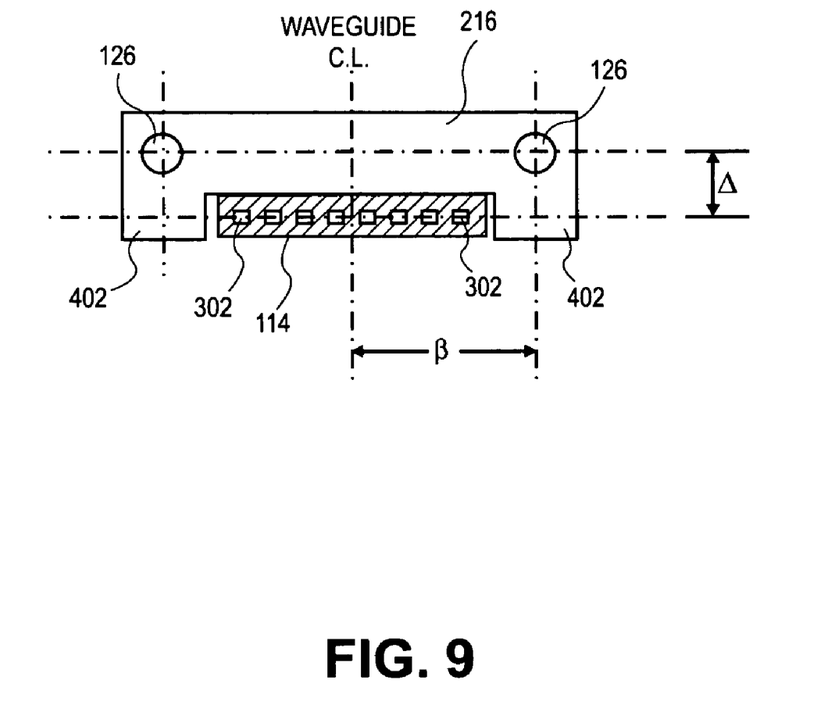
FIG. 9 is an elevation view of an embodiment of a connector and a waveguide of the present invention, illustrating lateral and vertical alignment of the connector and the waveguide.

FIG. 9 illustrates the alignment between the ferrule 216 and the waveguide array 114. To ensure that the waveguide array 114 properly mates with the external waveguide array 122 when the connector 120 is plugged into the connector 118 (see FIG. 1), the ferrule 216 must be properly aligned with the waveguide array 114, meaning that the distance $\Delta$ between the centers of the alignment holes 126 and the line along which the individual waveguides 302 are distributed must match the equivalent dimension on the mating connector 120. Similarly, the distance $\beta$ between the center of the alignment holes 126 and the centerline of the waveguide array 114 must match the corresponding dimension on the connector 120.

A matching distance $\Delta$ is accomplished by having the bottom 406 of the recess 404 of the connector in direct contact with the surface 704 of the waveguide array 114. The ferrules 216 can generally be built to a tolerance of ±2 microns, while the thickness of the cladding 304 can also be built to a tolerance of ±2 microns. By placing the two surfaces in direct contact with each other, tolerance buildup is minimized and the distance $\Delta$ can be controlled very accurately. Lateral alignment of the ferrule 216 and the waveguide array 114—that is, a matching distance $\beta$, is accomplished using the fiducial marks found on both components, as described above. Using the fiducial marks along with precise optics to align them, the distance can also be controlled very accurately. The distances $\Delta$ and $\beta$ need not be any particular value, so long as they match the corresponding dimensions on the mating connector. In the embodiment shown, $\Delta$ has a positive value, but in other embodiments it may take on a different value. For example, in a well-known multi-terminal (MT) type connector, the waveguide is exactly aligned with the guide holes, so that $\Delta$ has a value substantially equal to zero.

In a worst-case misalignment scenario with misalignment occurring diagonally across apertures of equal size, the overall misalignment between the waveguides in the external waveguide array 122 and the waveguides in the waveguide array 114 is about 5 microns. In an embodiment of the waveguide arrays 114 and 122 where the individual waveguides in both arrays are multi-mode and have an aperture size of about 50 microns, the misalignment leads to acceptable losses that are well within the optical link budget for an optical package such as package 100. With these tolerances, losses due to misalignment can be eliminated completely in an embodiment where the waveguides in one array are coupled to waveguides having a larger aperture, and where the optical signals carried by the array travel from the smaller apertures to the larger apertures. For example, a misalignment of 5 microns from a 50-micron aperture to a 55-micron aperture or from a 45-micron aperture to a 50-micron aperture will result in no signal loss due to misalignment at all.

Figure 10:
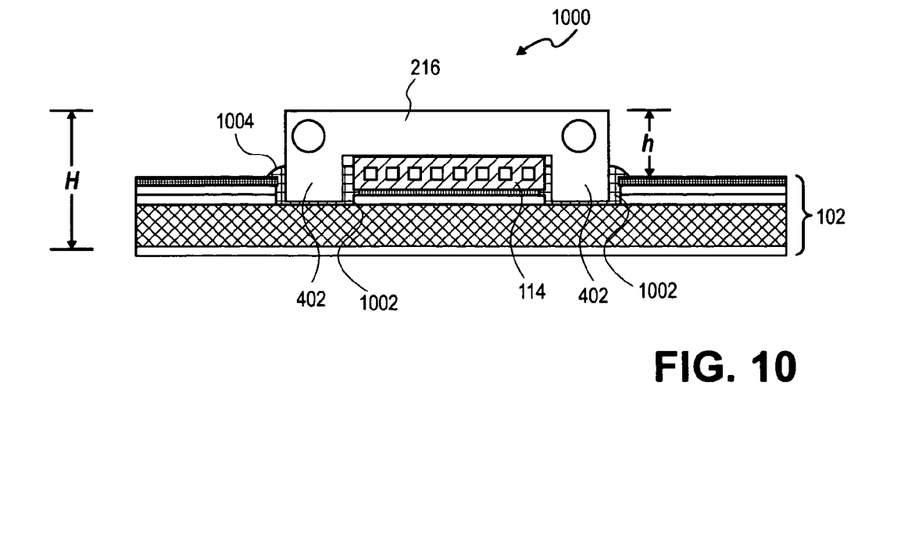
FIG. 10 is a side elevation illustrating an alternative embodiment of a connector of the present invention.

FIG. 10 illustrates the construction of an alternative embodiment 1000 of a connector assembly. The connector assembly 1000 is similar in design to the connector assembly 118 (see FIG. 2), but is designed to have a lower profile. In other words, the height h of the ferrule 216 above the surface of the substrate is smaller, so that the overall thickness H is reduced. As with the connector assembly 118, the connector assembly 1000 has a waveguide array positioned in a trench formed in at least one layer of a multi-layer substrate 102. Unlike the connector assembly 118, however, the connector assembly 1000 includes a pair of ferrule trenches 1002 adjacent to the trench 214 in which the waveguide array 114 is placed. The ferrule trenches are formed at the edge of the substrate adjacent to the trench 214, have a length corresponding to the length L of the ferrule 216 (see FIG. 4), and have a width designed to accommodate the supports 402 of the ferrule. The depth of the ferrule trenches 1002 is determined by the dimensions of the ferrule 216 and by the profile requirements of the connector 1000. The connector 1000 is manufactured much the same way as the connector 118 (see FIGS. 5–8), except that the supports 402 of the ferrule are inserted into the ferrule trenches 1002 instead of being placed on the substrate surface. The ferrule supports 402 are secured in the ferrule trenches 1002 using an adhesive 1004 that in one embodiment is dispensed in the trenches prior to insertion of the supports 402. As with the connector assembly 118, the waveguide array may be integrated with the substrate 102 rather than being attached to it via an adhesive layer 212.

Figure 11:
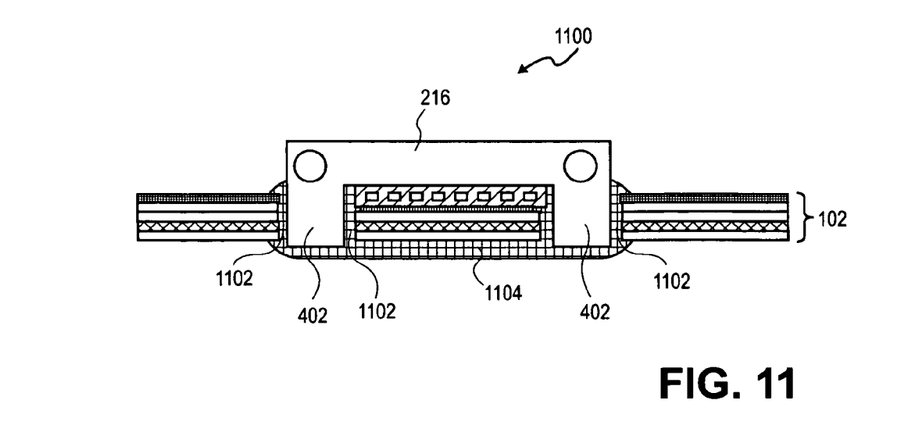
FIG. 11 is a side elevation illustrating another alternative embodiment of a connector of the present invention.

FIG. 11 illustrates the construction of an alternative embodiment 1100 of a connector. The connector 1100 is substantially similar in construction to the connector 1000. The primary difference between the connector 1100 and the connector 1000 is that the connector 1100 is designed for cases where the substrate 102 is thinner than the depth of the recess 404 in the ferrule 216. In such a case, the ferrule trenches 1002 of connector 1000 are replaced by a pair of ferrule slots 1102 that extend through the entire thickness of the substrate 102. In other respects, the ferrule slots 1102 are similar to the ferrule trenches 1002: the ferrule slots are positioned adjacent to the trench 214 at the edge of the substrate, have a length corresponding to the length L of the ferrule 216 (see FIG. 4), and have a width designed to accommodate the supports 402 of the ferrule. When the ferrule supports 402 are inserted in the slots 1102, they are secured in position by applying an adhesive 1104 into the slots and on one or both sides of the substrate.

Figure 12:
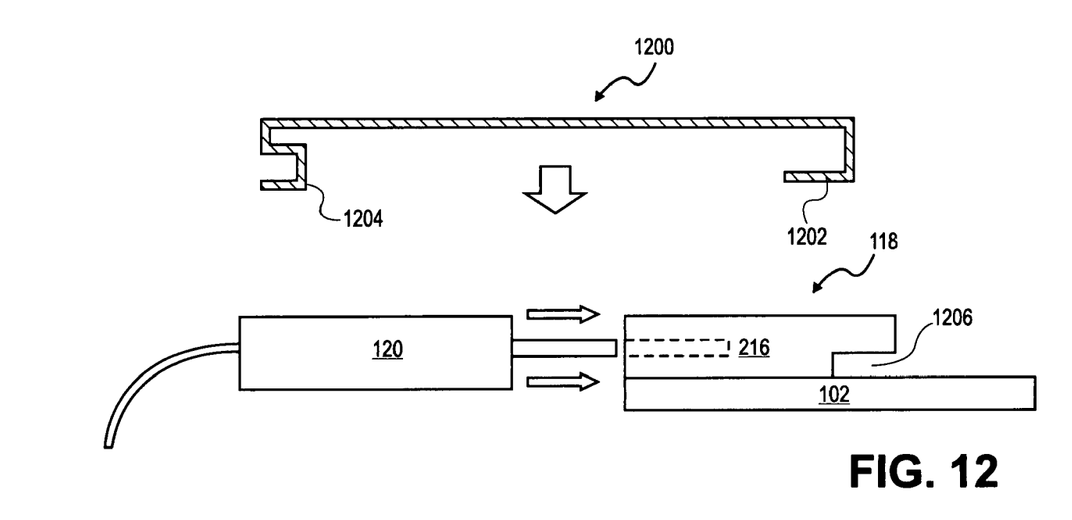
FIGS. 12 and 13 are side views illustrating an embodiment of a retention mechanism for maintaining a connection between an embodiment of the connector of the present invention and an external optical device.
Figure 13:
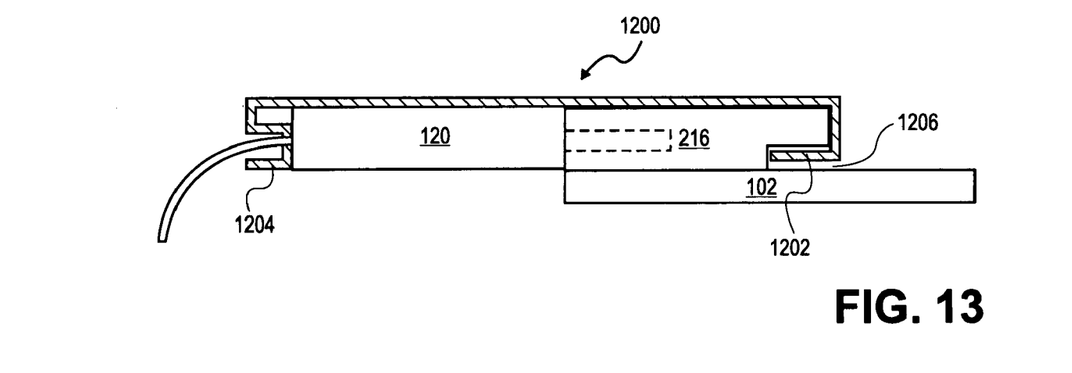

FIGS. 12 and 13 together illustrate an embodiment of a retention mechanism 1200 usable to hold together mating connectors such as connectors 118 and 120 shown in FIG. 1. FIG. 12 illustrates the coupling of the external connector 120 to the connector assembly 118. To connect the two, the alignment pins 124 on the external connector 120 are inserted into the corresponding alignment holes 126 on the ferrule 216 of the connector 118. The external connector 120 is pushed toward the connector assembly until the individual waveguides within the waveguide array 114 mate with their corresponding waveguides in the external waveguide array 122. Once the two connectors are in their final position, a clamp 1200 is used to keep the connectors together so that the optical connection is maintained. The clamp 1200 includes a pair of hooks 1202 on one end and one or more springs 1204 on the other end. In one embodiment, the clamp 1200 is made of metal, but in other embodiments it can be made of other materials as well. Once the two connectors 118 and 120 are mated, the hooks 1202 on one end of the clamp are inserted into a hole or slot 1206 in the rear of the ferrule 216.

FIG. 13 shows the assembled connection held together by the clamp 1200. The clamp 1200 is lowered onto the mated connectors until the springs 1204 engage a front end of the connectors and the hooks 1202 engage a rear end of the connectors. The force of the springs then allows the clamp 1200 to keep the connectors together.

Figure 14:
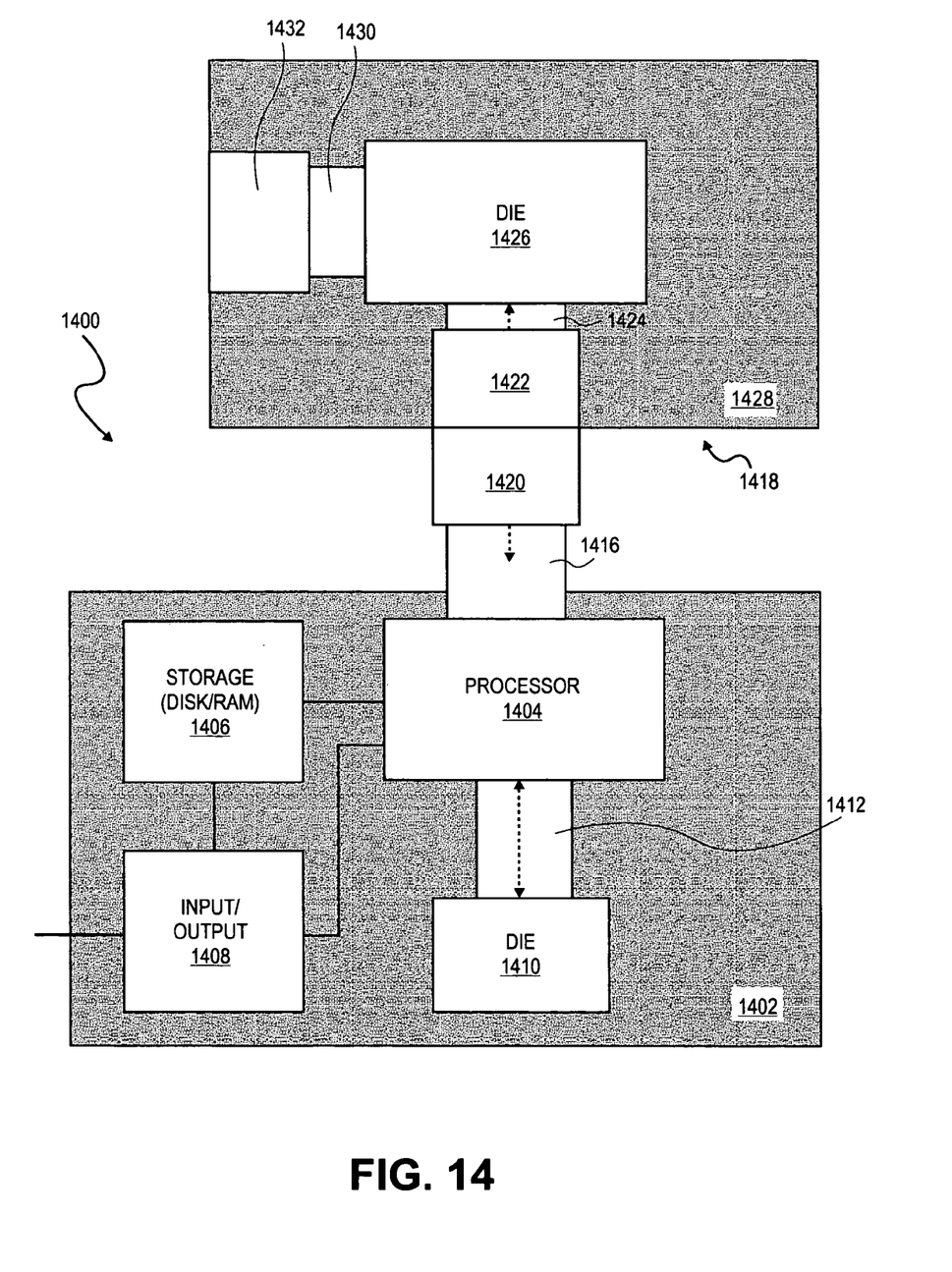
FIG. 14 is a plan view of an embodiment of a system including an embodiment of a connector according to the present invention.

FIG. 14 illustrates an embodiment of an optical system 1400 including the present invention. The system 1400 comprises a flip-chip processor 1404 that is flip-chip mounted to a substrate 1402. In one embodiment, the substrate 1402 can have a similar construction to the substrate 102 described in connection with the device 100. The processor 1404 comprises a flip-chip die including a pair of optical areas, which can include optical sources, optical detectors, coupling elements, and the like.

The processor 1404 is coupled to a storage device 1406, which in various embodiments can be a memory such as a dynamic random access memory (DRAM), synchronous dynamic random access memory (SDRAM), flash random access memory (RAM), and the like. The processor 1404 is also coupled to an input/output device 1408 that allows the processor to send and receive commands and data to and from devices outside the system. Although shown in this embodiment as electrically coupled to the processor 1404, in alternative embodiments the storage unit 1406 and input/output unit 1408 can be optically coupled to the processor. Also, it is not necessary to mount storage device 1406 and input/output device 1408 on the same substrate 1402 as the processor 1404.

The processor 1404 is coupled to another flip-chip die 1410 by a waveguide 1412. The flip-chip die 1410 is on the same substrate 1402 as the processor 1404. The processor 1404 is also coupled via waveguide 1416 and connector 1420 to an external optical package 1418. The external optical package 1418 includes a flip-chip die 1426 mounted on a substrate 1428. A waveguide array 1424 connects the die 1426 to a connector 1422 on the edge of the substrate. The construction of the optical package 1418 is similar to that of optical package 100, and in particular connector 1422 can have a construction similar to any of the previously-described connector embodiments. The die 1426 is coupled to the processor 1404 by joining connector 1420 to connector 1422, so that signals can travel from waveguide array 1416 into waveguide array 1424 or from waveguide array 1424 into waveguide array 1416 or in both directions.

In one mode of operation of the device 1400, the processor reads instructions or data from the storage unit 1406 or receives instructions or data from the input/output unit 1408. The processor performs some operation on the data or instructions and optically transmits the data or instructions to one or both of the dies 1410 and 1426 via the waveguides 1412, 1416, and 1424. The optical dies 1410 and 1414 may then perform further operations on the data or instructions, including, in the case of the die 1426, transmitting the data or instructions to other dies via the waveguide 1430 and connector 1432. In a second mode of operation, the processor 1404 receives data optically from one or more of the dies 1410 and 1426 via waveguides 1412 and 1416, respectively. The processor then stores this information in the storage device 1406 or sends it to the input/output device 1408.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
    a substrate having a waveguide trench therein, the waveguide trench extending to an edge of the substrate;
    a waveguide array positioned in the waveguide trench and extending to the edge of the substrate, the waveguide array having a first surface and a second surface spaced apart from the first surface, the first surface being positioned on a bottom of the waveguide trench; and
    a ferrule attached at or near the edge of the substrate and spanning a width of the waveguide array, wherein the ferrule is directly in contact with the waveguide array only along the second surface.

2. The apparatus of claim 1 wherein the waveguide and the ferrule include fiducial marks thereon for aligning the ferrule and the waveguide.

3. The apparatus of claim 1 wherein the waveguide array is flexible.

4. The apparatus of claim 1 wherein the waveguide is integrated with the substrate.

5. The apparatus of claim 1 wherein the ferrule includes a recess having a bottom, wherein the bottom is in direct contact with the second surface of the waveguide array.

6. The apparatus of claim 5 wherein at least one fiducial mark is placed on the bottom of the recess.

7. The apparatus of claim 1, further comprising a pair of ferrule trenches adjacent to the waveguide trench and positioned at or near the edge of the substrate.

8. The apparatus of claim 7 wherein the ferrule includes a recess between a pair of supports, wherein the recess has a bottom that is in direct contact with the second surface of the waveguide array and wherein the supports are positioned in the ferrule trenches.

9. The apparatus of claim 8, further comprising an adhesive to secure the supports in the ferrule trenches.

10. The apparatus of claim 1, further comprising a pair of ferrule slots adjacent to the waveguide trench and positioned at or near the edge of the substrate, the ferrule slots extending throughout the thickness of the substrate.

11. The apparatus of claim 10 wherein the ferrule includes a recess between a pair of supports, wherein the recess has a bottom that is in direct contact with the second surface of the waveguide array and wherein the supports are positioned in the ferrule slots.

12. The apparatus of claim 11, further comprising an adhesive to secure the supports in the ferrule slots.

13. The apparatus of claim 1, further comprising a retention mechanism to hold an external connector to the ferrule.

14. The apparatus of claim 13 wherein the retention mechanism comprises a spring clamp.

15. A process comprising:
    positioning a waveguide in a waveguide trench on a substrate, the waveguide extending to an edge of the substrate, wherein the waveguide includes a first surface and a second surface spaced apart from the first surface, the first surface being positioned on a bottom of the waveguide trench; and
    attaching a ferrule at or near the edge of the substrate, the ferrule including a recess having a bottom, wherein the bottom of the recess is in direct contact with the waveguide only along the second surface.

16. The process of claim 15 wherein positioning the waveguide array in the waveguide trench comprises:
    dispensing adhesive in the bottom of the waveguide trench; and
    inserting the waveguide in the waveguide trench on top of the adhesive.

17. The process of claim 15 wherein positioning the waveguide in the waveguide trench comprises integrating the waveguide into the substrate during build-up of the one or more layers that comprise the substrate.

18. The process of claim 15, further comprising aligning the ferrule and the waveguide.

19. The process of claim 18 wherein aligning the ferrule and the waveguide comprises:
    positioning the ferrule near the waveguide;
    aligning a fiducial mark on the ferrule with a fiducial mark on the waveguide; and
    lowering the ferrule onto the waveguide.

20. The process of claim 15 wherein attaching the ferrule to the substrate comprises:
    dispensing beads of adhesive adjacent to the waveguide trench; and
    placing the ferrule on the adhesive.

21. The process of claim 15, further comprising forming a pair of ferrule trenches adjacent to the waveguide trench.

22. The process of claim 21 wherein the ferrule includes a recess between a pair of supports, wherein the recess has a bottom that is in direct contact with the second surface of the waveguide and wherein the supports are positioned in the ferrule trenches.

23. The process of claim 15, further comprising forming a pair of ferrule slots adjacent to the waveguide trench, the slots extending through the full thickness of the substrate.

24. The process of claim 23 wherein the ferrule includes a recess between a pair of supports, wherein the recess has a bottom that is in direct contact with the second surface of the waveguide and wherein the supports are positioned in the ferrule slots.

25. A system comprising:
    a first optical package including:
        a first substrate having a waveguide trench therein and an optical die thereon, the waveguide trench extending from the optical die to an edge of the substrate,
        a waveguide array positioned in the waveguide trench and extending from the optical die to the edge of the substrate, the waveguide array having a first surface and a second surface spaced apart from the first surface, the first surface being positioned on a bottom of the waveguide trench, and
        a ferrule attached at or near the edge of the substrate and spanning a width of the waveguide array, the ferrule being directly in contact with the waveguide array only along the second surface;

a second optical package including
  a second substrate having an optical die thereon, and
  a synchronous dynamic random access memory (SDRAM) coupled to the optical die; and
an external waveguide coupled to an external connector, wherein the optical die of the first optical package is coupled to the optical die of the second optical package by coupling the external connector to the ferrule.

26. The apparatus of claim 25 wherein the ferrule includes a recess having a bottom, wherein the bottom is in direct contact with the second surface of the waveguide.

27. The apparatus of claim 25, further comprising a pair of ferrule trenches adjacent to the waveguide trench and positioned at or near the edge of the first substrate.

28. The apparatus of claim 27 wherein the ferrule includes a recess between a pair of supports, wherein the recess has a bottom that is in direct contact with the second surface of the waveguide array and wherein the supports are positioned in the ferrule trenches.

29. The apparatus of claim 25, further comprising a pair of ferrule slots adjacent to the waveguide trench and positioned at or near the edge of the first substrate, the ferrule slots extending throughout the thickness of the first substrate.

30. The apparatus of claim 29 wherein the ferrule includes a recess between a pair of supports, wherein the recess has a bottom that is in direct contact with the second surface of the waveguide array and wherein the supports are positioned in the ferrule slots.

31. The apparatus of claim 25, further comprising a retention mechanism to hold the external connector to the ferrule.

32. The apparatus of claim 31 wherein the retention mechanism comprises a spring clamp.

* * * * *